UNITED STATES PATENT OFFICE.

PAUL MERSCH, OF PARIS, FRANCE.

INCREASING ILLUMINATING POWER OF ELECTRIC-ARC LAMPS.

SPECIFICATION forming part of Letters Patent No. 584,694, dated June 15, 1897.

Application filed April 14, 1897. Serial No. 632,179. (No specimens.)

*To all whom it may concern:*

Be it known that I, PAUL MERSCH, a subject of the Grand Duke of Luxemburg, residing in Paris, France, have invented an Improved Composition for Increasing the Illuminating Power of Electric-Arc Lamps, of which the following is a specification.

This invention relates to a chemical composition intended for the manufacture of mantles or blocks of any description whatever applicable for use with electric-arc lamps, with the object of increasing their illuminating power.

The composition is obtained in the form of a paste by the admixture of the substances enumerated below. This paste, owing to its composition, possesses the following properties: It is absolutely incombustible and hardens more and more under the influence of heat. It may be rendered incandescent at the highest as well as at the lowest temperatures without becoming deteriorated or volatilized. The paste may be fashioned into all kinds of forms applicable for electric-arc lamps. For example, mantles may be made serving to surround the carbons of arc-lamps at the luminous point, or reflectors, blocks intended to be interposed between the two luminous points of the lamp-carbons, tubes completely surrounding these carbons. In short, this paste may be worked into any form requisite or desirable for the purpose of its use with the object of obtaining the result aimed at—that is to say, of imparting to voltaic arc-lamps the greatest possible illuminating power.

The chemical composition of the paste intended to be used in the above manner is as follows: Approximately equal parts of each of the three following bodies are taken and mixed together: first, carbonate of magnesia; second, asbestos or any other kind of incombustible flax; third, silicate of potash. The combination of these three substances gives a homogeneous paste capable of taking any suitable form, hardening under the action of heat, while at the same time it is raised to incandescence.

What I claim is—

As a new article of manufacture, the herein-described composition for increasing the illuminating power of electric-arc lights, consisting of the admixture of carbonate of magnesia, asbestos or some other incombustible textile product, and silicate of potash.

In testimony whereof I have signed my name to this specification in the presence of two subscribing witnesses.

PAUL MERSCH.

Witnesses:
ALPHONSE MEJEAU,
EDWARD P. MACLEAN.